(12) United States Patent
Harper (10) Patent No.: US 8,360,106 B2
(45) Date of Patent: Jan. 29, 2013

(54) CURVED PLIANT FILM VALVES

(76) Inventor: William Anthony Harper, Redmond, WA (US)

( * ) Notice: Subject to any disclaimer, the term of this patent is extended or adjusted under 35 U.S.C. 154(b) by 523 days.

(21) Appl. No.: 12/660,574

(22) Filed: Mar. 1, 2010

(65) Prior Publication Data

US 2011/0211974 A1 Sep. 1, 2011

(51) Int. Cl.
*F16K 15/16* (2006.01)
(52) U.S. Cl. .................................. 137/857; 137/843
(58) Field of Classification Search .................. 137/843, 137/851, 852, 857
See application file for complete search history.

(56) References Cited

U.S. PATENT DOCUMENTS

| | | | |
|---|---|---|---|
| 3,955,594 A | 5/1976 | Snow | |
| 4,381,019 A * | 4/1983 | Lindtveit | ................. 137/843 |
| 5,010,925 A | 4/1991 | Atkinson | |
| 5,144,986 A | 9/1992 | Drew | |
| 5,755,263 A | 5/1998 | Jang | |
| 6,536,631 B1 | 3/2003 | Nickels | |
| 6,810,914 B2 | 11/2004 | Persson | |
| 7,306,129 B2 | 12/2007 | Swiss | |
| 7,594,595 B2 | 9/2009 | Gueret | |

* cited by examiner

*Primary Examiner* — Kevin Lee
*Assistant Examiner* — Macade Brown (57) ABSTRACT

Disclosed is a one-way valve and sealing assemblage wherein an affixed curved pliant film device, a compressible spring, and a reciprocal curved channel surface automatically work cooperatively to permit forward material flow above a predetermined fluid pressure threshold yet check reverse material backflow at any pressure.

33 Claims, 9 Drawing Sheets

CURVED PLIANT FILM VALVES

FIELD OF THE INVENTION

This invention relates to the field of fluid flow control by mechanical devices known as valves. More specifically the invention comprises a one-way valve assemblage wherein an affixed curved pliant film device, a compressible spring, and a reciprocal curved channel surface automatically work cooperatively to permit forward material flow above a predetermined fluid pressure threshold yet check reverse material backflow at any pressure.

BACKGROUND OF THE INVENTION

Valve control of fluid flow, both gases and liquids, is an old and well populated art. Numerous styles of soft valve are known, the following are representative of current art. Collectively, arranged chronologically, each with a short description, they provide in their entireties, a background for understanding the current teachings regarding curved pliant film valves.

Snow, U.S. Pat. No. 3,955,594 (1976), "Pressure Operated Valve Systems" describes a relatively simple pinch valve formed as a normally closed elastic collar which blocks flow in a steel pipe. When sufficient pressure is applied to a fluid material like unset concrete the closed sleeve-like collar is forced open and a flow passageway created, the only control to open and close the valve is the pressure applied by the fluid itself. There is no provision for one-way control, sufficient pressurized backflow can open the passageway as easily as forward flow.

Atkinson, U.S. Pat. No. 5,010,925 (1991), "Normally Closed Duckbill Valve Assembly" is representative of a large category of one-way valves characterized by their descriptive duckbill shaped lips. Numerous variations exist derived from the size, shape and other attributes of design. Here, novelly shaped valve lips pivot outwardly on comparatively narrow stalks to open a relatively unrestrictive passageway to fluid flow. Common problems with such designs are the narrow sealing area afforded by the lips which wear rapidly due to flutter movement, damaged to the lips by fluid content, and lip seals that are prone to clogs contributing to leakage.

Drew, U.S. Pat. No. 5,144,986 (1992), "One Way Flow Device" describes a class of simple film valves sometimes seen in novelties such as balloons. Drew teaches a film attached to the sides of a fluid channel so as to allow only flow through a hole in the film. The film has sufficient longitudinal movement so that when flow is in a forward direction it moves the hole to the channel center but when flow is reversed the film with the hole is pushed against a channel wall and effectively closed. Due to the restrictive nature of the hole as the only passage for flow, clogging and poor seals are common with this design.

Jang, U.S. Pat. No. 5,755,263 (1998), "Backward Flow Prevention Device" describes a variation of a duckbill design best described as a windsock duckbill. A truncated cone of flexible material is mounted on a capped pipe with side holes as fluid outlets. The windsock tube trails off downstream in the channel, guiding all flow from the outlet to the far end of the cone where it emerges back into the channel. When reverse flow occurs the sock collapses and is bunched up at off-angle to the pipe thereby preventing the backflow from entering the outlet holes. A design having limited if functional applications.

Nickels, U.S. Pat. No. 6,536,631 (2003), "Sealed Fluid Dispensing Device" is representative of art where foam collars act as valves for handheld dispensers, the distinctions between numerous patented designs is subtle. They generally operate, as here, by forcing liquid from a pressure operated reservoir, up a channel to emerge from a fixed body clad with an elastic membrane. Under pressure the fluid separates a portion of the membrane from the body to form a passageway to a top outlet where the fluid is released for distribution. Absent fluid pressure the membrane closes on the body once again and seals off the temporary fluid channel. A useful technique having expanded the art through many manifestations.

Persson, U.S. Pat. No. 6,810,914 (2004), "Method and Arrangement to Accomplish a One-Way Flow" describes a plastic bag deployed in a sewer pipe to prevent backflow while offering minimal interference to continuous sewage outflow. Noting that swinging iron gates and like devices impede flow and often result in disastrous blockage, a flexible elastic bag partially glued to the pipe wall is designed to flatten against the pipe wall during outflow thereby offering minimal resistance but deploys to open and fill with backflow fluid to temporarily block the sewer when reverse flow occurs. It is problematic whether the bag could survive the harsh conditions of sewer flow and sewage content, successfully deploy as contemplated, and avoid creating the very blockages it is designed to alleviate.

Swiss, U.S. Pat. No. 7,306,129 (2007), "One Way Valve Assembly" describes another elastomeric membrane design covering a fixed core where ports allow flowable substances to push the flexible membrane away so as to form a flow path to a dispensing exit. Here, the membrane, when not pushed out by fluid pressure, blocks the ports so as to seal them against any backflow bearing contaminants. Swiss is distinguished from Nickels only by the shape and function of its inner core. In this class of dispensing valves the distinctions are often quite subtle.

Gueret, U.S. Pat. No. 7,594,595 (2009), "Device and Method for Dispensing of a Product" teaches a valve for controlling fluid flow described as a flow reducer which is essentially a foam disc with variously shaped slits through its center where pressurized fluid from a lower reservoir follows these slit routes to exit on the upper foam surface for dispensing. A key feature distinguishing this art is that the foam is permeable to air which allows atmospheric air to enter the reservoir thereby alleviating the buildup of negative reservoir pressure when the squeeze is released. While the device has some valve characteristics, it does require a cap on the foam disc to prevent leakage and evaporation given the foam is porous to fluids.

None of these disclosures individually or in aggregate either describe or suggest a particularly low-cost, reliable, disposable, minimal component, securely sealing one-way valve action that is easy to manufacture. The need for such a securely sealing one-way valve of simple, economical design has yet to be met.

SUMMARY OF THE INVENTION

The present invention recognizes the abundance of prior art and contributes a specific advancement over that same art. Accordingly it is the particular intent of the present invention to provide a simple one-way valve assemblage capable of being self-sealing to positive forward pressurized flow below a predetermined threshold pressure, open to positive forward flow above that threshold point, and completely closed to reverse backflow at all pressures. Further, the forward pressurized flow should not be significantly restricted by passage through an open valve. In aggregate a curved pliant film (cpf)

valve consists of four principle components assembled to control fluid flow. First, a fluid channel with interior channel surfaces capable of both containing and guiding a flowable material like water, air and any such characteristically flowable material herein collectively described as fluids. Second, a pliant film device constructed from such as a flexible polymer film with the ability to closely conform to the interior surfaces of the channel and arranged in such a manner so as to be capable of extending along and across the channel in a manner sufficient to block the channel. Third, various attachment means capable of affixing portions of the pliant film device to the fluid channel so that a fluid passage is formed which guides all flowable material between the film device and the interior surface of the channel. And fourth, a compressible spring element in contact with portions of the bottom surface of the film device so that in a relaxed state the partially compressed spring pushes portions of the associated upper film surface against portions of the channel surface to close the fluid passage, sealing the passage to forward fluid flow when such forward fluid pressure is below a predetermined threshold pressure, yet when sufficient forward fluid pressure exists above the threshold to compress the spring allowing portions of the film to move away from the channel surface thereby creating an open fluid passage, and by virtue of the affixed film device having the capacity to block backflow at any pressure by being pressed against portions of the channel surface, backflow material is prevented from passing upstream. By this assemblage of four components, arranged in the new and novel manner as taught herein, the present invention represents a genuine enrichment of the art.

Specifically, the teachings disclosed herein are keyed to a new valve exhibiting the twin attributes of providing forward one-way flow control (no backflow) and having an opening threshold pressure point which provides a normally sealed (closed) aspect so as to prevent leakage of material flow from such embodiments as fluid dispensers. These twin valve attributes (threshold auto-sealing for forward flow control and backflow prevention) have been represented in the prior art by the classic spring and ball linear design found in countless push-top dispensers, where these hard component devices provide the same twin operational functions. In the new art those attributes are provided by soft components such as foam springs and polymer film assembled to function as curved pliant film valves. Use of these materials permits improved value designs which present flatter lateral aspect, use less material, are simpler to manufacture, are of significantly smaller size, and affords by these features opportunities to build more useful and improved products such as fluid dispensing packs, pouches, bottles, bags, cans and other containers.

It is therefore the principle object of the present invention to provide an automatic one-way fluid valve which is sealed below a specific threshold point to forward pressurized flow and closed to all fluid backflow at any pressure.

A specific object of this invention is to provide a curved pliant film (cpf) valve which is of such few parts and simple design as to be readily adaptable to a straight forward and economical manufacturing process.

Another object of the present invention is to create a one-way valve of such minimal weight, size and reliable design that it promotes widespread and convenient product usage while conserving material even though intended for disposable applications.

Another object of the present invention is to provide a valve which prevents both atmospheric contamination from passing upstream and loss of fluidic quality and/or quantity downstream.

Another object of the present invention is to create a valve with a laterally flat aspect which permits the design and construction of compact, pocketable, multi-dose packets and pouches used for the dispensing of fluids.

Another object of the present invention is to provide simple, economical, and reliable inlet and/or outlet valves for use in pumps and other devices capable of propelling fluid.

Another object of the present invention is to create a valve which by its unique design alleviates constricted flow through the valve by providing an enhanced cross-sectional area at the point of control.

Another object of the present invention is to create a valve capable of sustaining negative upstream pressure to achieve related functional objectives made possible by cpf valve design.

These and other objects and advantages of the present invention will become apparent from the following description taken in conjunction where appropriate with the accompanying drawings wherein are set forth, by way of illustrations and example, certain embodiments of this invention. The drawings constitute a part of this specification and include exemplary embodiments of the present invention and illustrate various objects and features thereof.

BRIEF DESCRIPTION OF THE DRAWINGS

The invention is best understood and objectives even beyond those already cited will become apparent when consideration is given to the following detailed illustrations thereof. Such descriptive specificity makes reference to the annexed drawings wherein.

DETAILED DESCRIPTION OF THE INVENTION

While the invention will be described in connection with illustrations, descriptions, and examples of preferred embodiments, it will be understood these are not intended to limit the present invention only to these embodiments. On the contrary, the present invention is to cover all structural and/or functional alternatives as generally described.

The present invention is best understood by describing several functional design scenarios that illustrate and describe how various aspects of each valve assemblage works and the functional techniques taught. Two categories of exemplifying models are shown, a curved sheet pliant film device (FIGS. 1-6) and a tubular pliant film device (FIGS. 7-12). In each of these two category the basic functionality remains the same, specifically the use of a resilient spring to position a curved pliant film device in a fluid channel so as to either block or allow forward pressurized fluid flow by opening a passage to pass fluid by the affixed film device when forward pressure exceeds a predetermined pressure threshold or block any reverse backflow of fluid passing upstream beyond the affixed film device. Whether the film device is formed as a curved flat sheet or a tubular cylinder, the operating principle is common to both though enhanced operational elements can be dependent on attributes of each specific design.

Figure 1:
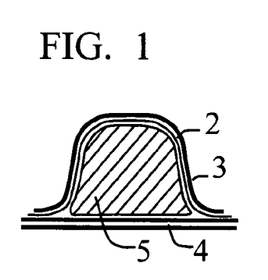
FIG. 1 is a lateral cross-sectional view of a fluid channel showing the relationship of channel surfaces, curved sheet pliant film device and compressible spring elements in a flow blocking arrangement.
Figure 2:
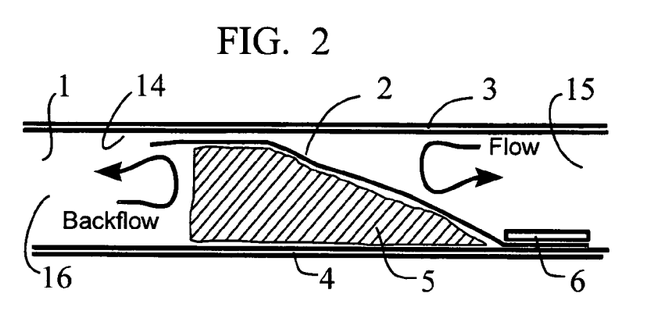
FIG. 2 is a longitudinal side view after FIG. 1 showing relationship of channel, sheet pliant film device and compressible spring elements in a blocking arrangement to fluid flow in both directions.
Figure 3:
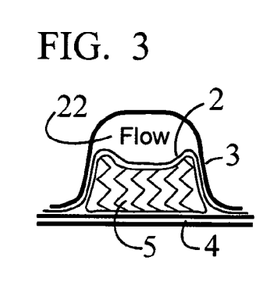
FIG. 3 is a lateral cross-sectional view of a fluid channel showing relationship of channel, curved sheet pliant film device and compressible spring elements in an unblocked arrangement permitting forward fluid flow when spring is compressed by sufficient forward fluid pressure beyond a predetermined pressure threshold point.
Figure 4:
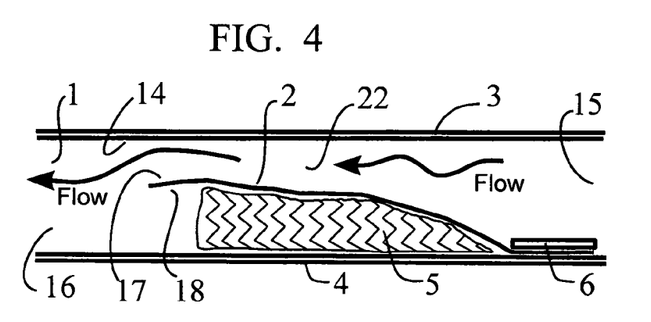
FIG. 4 is a longitudinal side view after FIG. 3 showing relationship of channel, curved sheet pliant film device and compressible spring elements in an unblocking arrangement to forward fluid flow.
Figure 5:
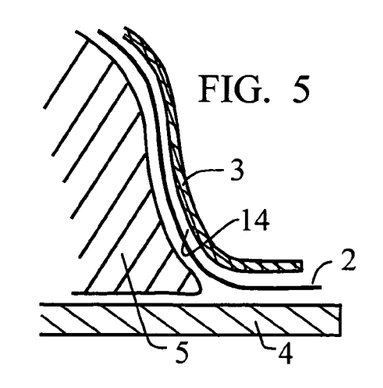
FIG. 5 is a cross-sectional view of channel after FIGS. 1-4 showing detail of elements and specifically joint of channel and base capturing and thereby affixing a portion of sheet film in an attaching manner.

In FIG. 1 a lateral cross-sectional view shows a channel wall 3 which partially defines a fluid channel blocked by a curved sheet pliant film device 2 positioned by a partially compressed compressible spring 5 in a relaxed state supported by a base channel wall 4 which completes the definition of the fluid channel. The film device 2 is affixed in position by portions being clamped in the joint formed by the upper channel wall 3 and base channel wall 4 thereby attaching portions of the film device 2 to the channel walls 3, 4 as illustrated. In FIG. 2 a longitudinal side view after FIG. 1 shows the cpf valve parts of the upper channel wall 3 and base channel wall 4 defining a fluid channel 1 which is blocked to both forward flow and backflow as indicated by the curved sheet pliant film device 2 being pushed by the compressible spring against the channel wall 3 so as to block both flows from passing into the their respective downstream channel 16 or upstream channel 15 beyond the affixed film device 2. The pliant film device 2 has conformed closely to the channel surface 14 so as seal off the fluid channel 1 to any flowable material moving in either direction. An attachment device 6 provides lateral closure and attachment of the film device 2 as the channel wall joints do longitudinally, these various attachments working to affix the film device 2 in the fluid channel 1. In FIGS. 3-4 a fluid passage 22 has been opened between the upper channel wall 3 and the film device 2 when upstream fluidic pressure in the upstream channel 15 exceeded a predetermined threshold pressure sufficient to compress the compressible spring 5 through pressure on the film device 2 top surface 17 sufficient to open a fluid passage 22 between the top surface 17 of the film device 2 and the channel surface 14 of the upper channel wall 3, yet preventing backflow of flowable material as previously shown in FIGS. 1-2 motivated by positive down stream pressure in the downstream channel 16 where backflow exerts pressure on the bottom surface 18 of the film device 2 sufficient to push the corresponding top surface 17 against the channel surface 14 so as to seal off the fluid passage 22 thereby preventing backflow material in the downstream channel 16 from passing into the upstream channel 15 beyond the affixed film device 2. In FIG. 5 the detail of the joint formed by the upper channel wall 3 and the base channel wall 4 illustrates the attachment of the sheet film device 2 within the fluid channel 1 and how the compressible spring 5 pushes the curved pliant film device 2 against the curved surface 14, closely conforming one to the other so as to form a tight seal to control fluid flow and prevent unintended flow of flowable material below a threshold of predetermined pressure such as necessary for reliably sealing fluid dispensers. The opening of the seal, with the creation of a fluid passage 22 when upstream channel fluidic pressure exceeds the threshold pressure, creates a pressurized downstream dispensing flow which can be characterized as a spurt of flowable material.

Figure 6:
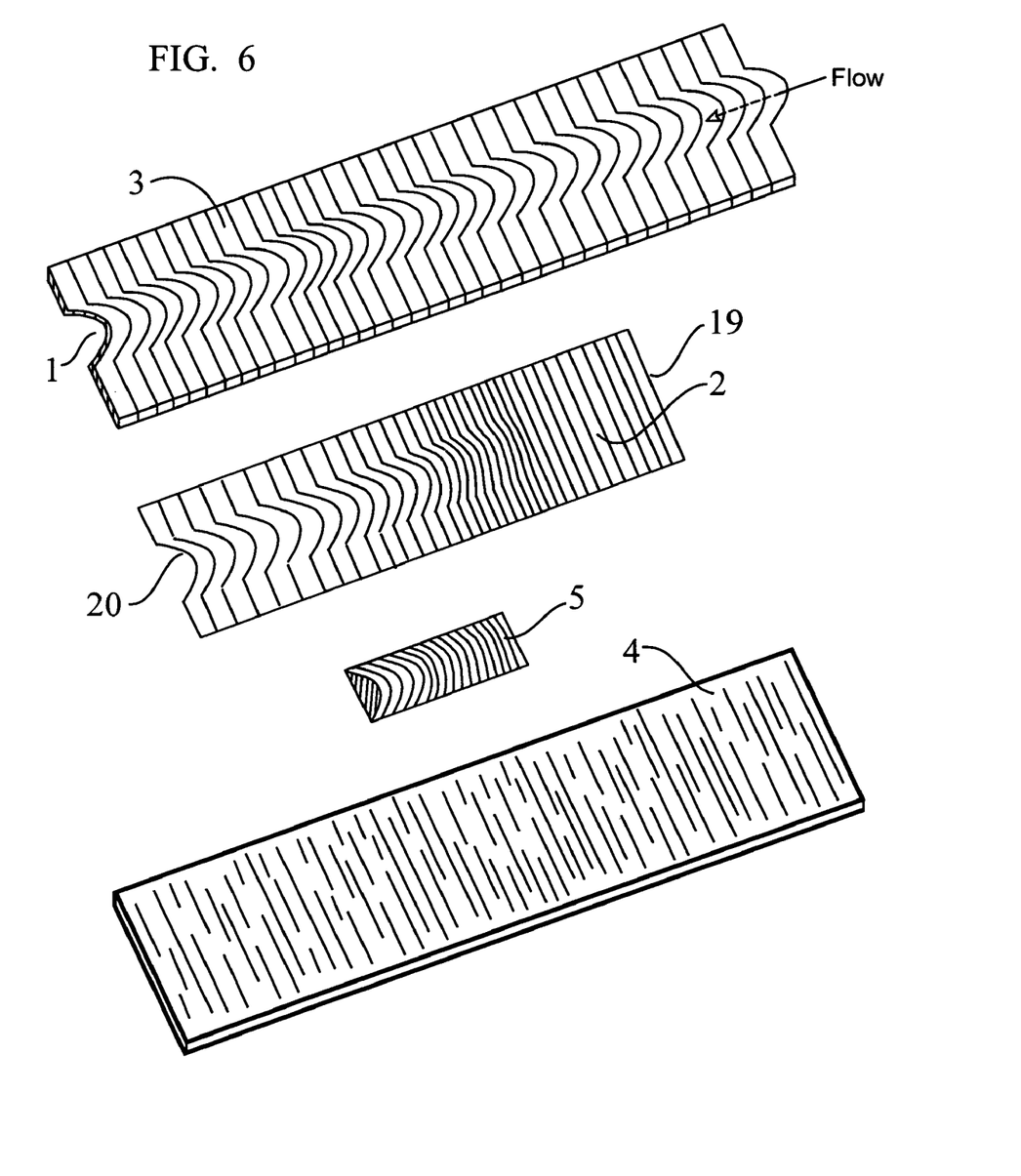
FIG. 6 is an isometric exploded view comprised of a upper channel part, a sheet pliant film device, a compressible spring part and a base channel part as they could be assembled as represented in FIGS. 1-5.

In FIG. 6 derived from FIGS. 1-5 an exploded view shows how four parts cpf valves are assembled. The upper channel wall 3 part composed of material such as polymers, thermoplastic moldings, resin castings, metals, glasses, ceramics, extrusions, laminates, compositions in combination or alone is formed with a curved arch which defines a fluid channel 1 for conveying flowable material flow as indicated. The curved pliable film device 2 part composed of at least one flexible polymeric material shows an arch feature terminating at the downstream edge 20, opposite to upstream edge 19, that conforms to and covers the compressible spring 5 part positioned between the film device 2 part and the base channel wall 4 part. The compressible spring 5 part is composed of resilient material such as polymeric foams, natural rubbers, synthetic rubbers, thermoplastics, organic fibers, synthetic fibers, metals, plastics, resins, glasses, and combinations thereof formed with physical features which provide resilient and/or compressible characteristics such as cavities, hollows, arches, curves, tapers, grooves, planes, incisions, creases, indentations and combinations therefore. The base channel wall 4 part, comprised of similar material to the upper channel wall 3, when joined with the other parts, completes the assemblage of a cpf valve and forms a complete channel surface 14. In FIGS. 1-6 it is illustrated that the relatively wide and broad pliable top surface 17 of the film device 2 affords, when pressed against the channel surface 14, a wide band capable of affecting a secure seal by the capacity to closely conform to the channel surface thereby embedding and thus overcoming leakage created by any surface irregularities and/or trapped solid content carried by flowable material.

Figure 7:
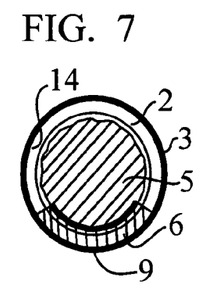
FIG. 7 is a lateral cross-sectional view of a tubular fluid channel showing the relationship of a pipe channel, a tubular pliant film tube device, an encircled compressible spring and attachment elements in a flow blocking relationship.
Figure 8:
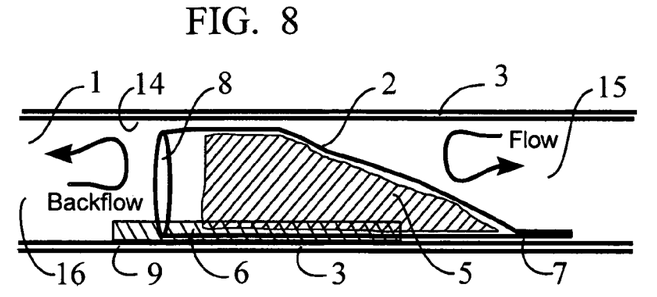
FIG. 8 is a longitudinal side view after FIG. 7 showing relationship of pipe channel, tubular pliant film device, encircled compressible spring and attachment parts in a blocking arrangement to fluid flow in both directions.
Figure 9:
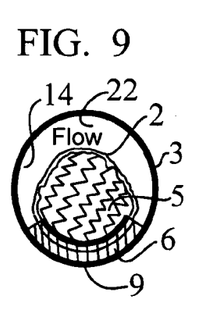
FIG. 9 is a lateral cross-sectional view of a fluid channel as a pipe showing relationship of channel, tubular pliant film device and encircled compressible spring elements in an unblocking arrangement permitting fluid flow when spring is compressed by sufficient forward fluid pressure above a predetermined threshold pressure.
Figure 10:
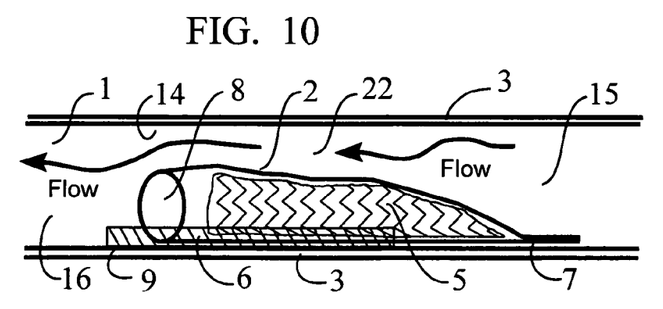
FIG. 10 is a longitudinal side view after FIG. 9 showing relationship of pipe channel, tubular pliant film device, encircled compressible spring and attachments elements in an unblocked arrangement permitting fluid flow when spring is compressed by pressure above the predetermined threshold by sufficient forward fluid pressure.
Figure 11:
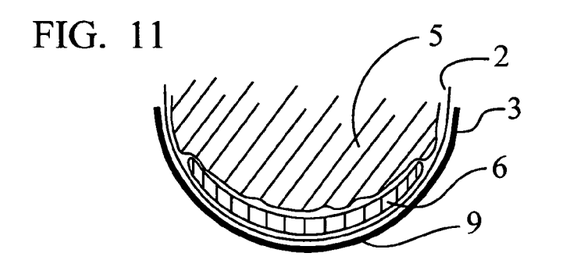
FIG. 11 is a cross-sectional view after FIGS. 7-10 of pipe channel showing detail elements and specifically a representative attachment of a portion of the pliant film tube to the channel wall.

In FIGS. 7-12 a second category of cpf valve is shown where the film device 2 is of a tubular design, a tube of polymeric material arranged to encircle the compressible spring 5, in contrast to a first category sheet design that covered the compressible spring. FIG. 7 shows a lateral cross-sectional view where the blocking film device 2 is against the channel surface 14, pushed in place by a partially compressed compressible spring 5 in a relaxed state in a manner previously described. The tubular film device 2 is affixed to the channel wall 3 by an attachment device 6 in a connection area 9. The attachment means used, and applicable to other affixing requirements herein, includes adhesives, clamps, mechanical fasteners, pressure devices, tensions devices, magnetism, heat seals, chemical seals and any combinations thereof which effects attachment. These attachment means can also be used beyond affixing the film device 2 and/or compressible spring 5 in the fluid channel 1 to other such purposes as affixing portions of the film device 2 to the compressible spring 5. In FIG. 8 a longitudinal side view after FIG. 7 shows the tubular cpf valve blocking the fluid channel 1 with the open tube end 8 shown in the downstream channel 16 whereas the closed tube end 7 is shown in the upstream channel 15. In this blocking arrangement not only is backflow prevented as indicated but a condition of upstream negative pressure is possible which can be useful to upstream operations employing negative pressure to purpose. In FIGS. 9-11 a fluid passage 22 has opened between the channel wall 3 represented by the channel surface 14 and the tubular film device 2 when upstream fluidic pressure in the upstream channel 15 exceeded a predetermined threshold pressure sufficient to compress the compressible spring 5 through pressure on the film device 2, this and other functions described previously for the sheet film device. The attachment device 6 is variously shown to extend beyond the film tube end 8 by way of exemplifying at least one technique for attaching the film device 2 and/or spring 5 to the channel wall 3 so as to affix the tubular film device 2 in the fluid channel 1. Attachment to the channel wall 13 can also be found at the closed tube end 7.

Figure 12:
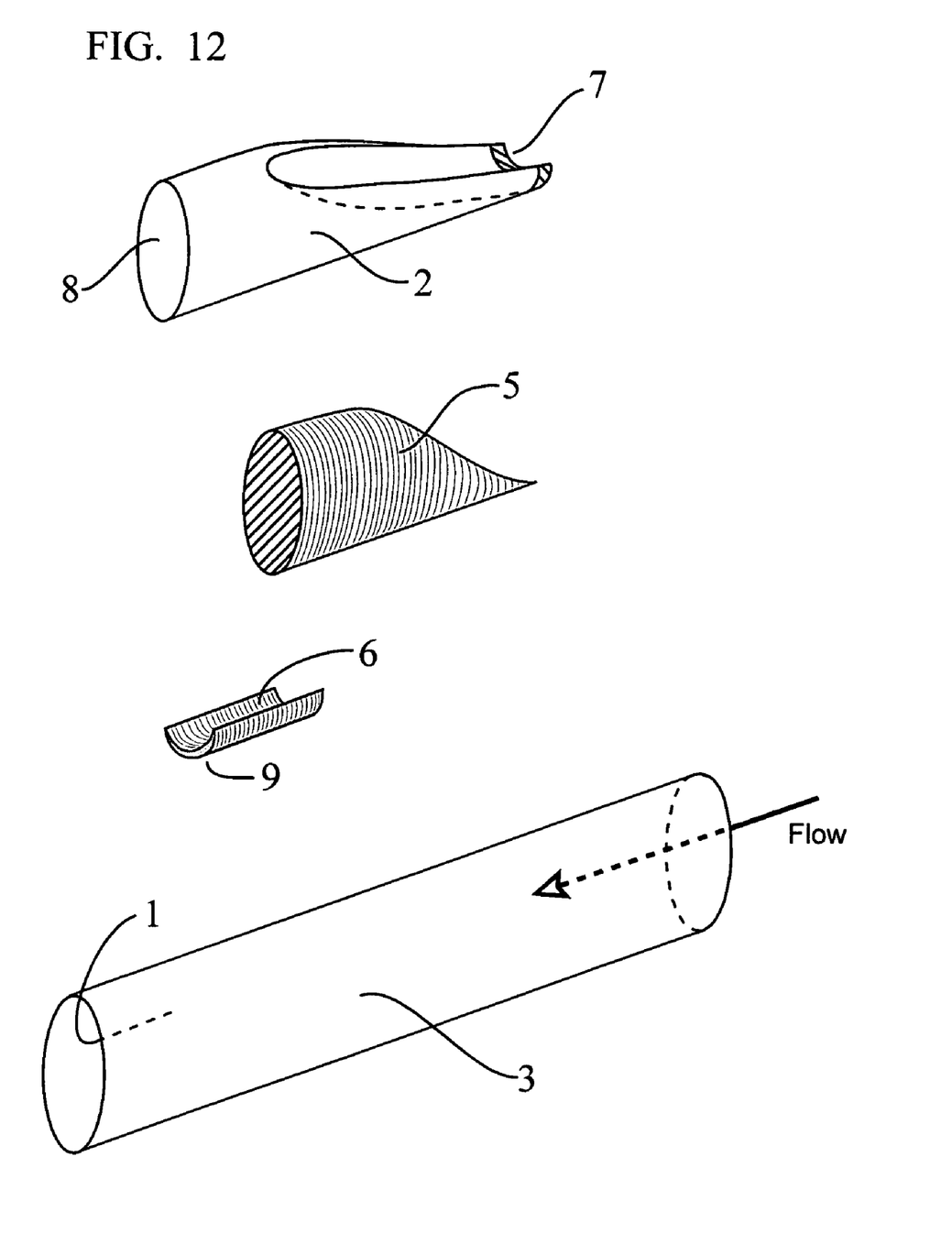
FIG. 12 is an isometric exploded view derived from FIGS. 7-11 comprised of a tubular pliant film device sealed at forward end, a rounded compressible spring, an attachment fixture and a channel pipe showing forward flow direction.

In FIG. 12 derived from FIGS. 7-11 an exploded view shows how the parts of a tubular cpf valve are nested together. Composed and formed as previously described, the tube film device 2 with a sealed closed end 7 encircles a compressible spring 5 and portions of attachment devices, all of which is located within channel wall 3 where the film device is affixed to control flow in the fluid channel. To prevent dislodgement by backflow pressure in the downstream channel 16 of the film device 2 it is shown in FIGS. 7-12, and previously in FIGS. 1-6, those portions of the downstream edge 20, and open tube end 8, are affixed to the channel walls 3. To prevent dislodgement by forward fluidic pressure in the upstream channel 15 of the film device 2 it is likewise shown that portions of the upstream edge 19, and closed tube end 7, are affixed to the channel walls 3. Referencing the same figures, it is shown that to enhance backflow prevention the downstream edge 20 and open tube end 8 of the film device 2 protrudes beyond the compressible spring 5 even though the same technique of backflow blockage previously described can be accomplished by transfer of backflow pressure through the compressible spring 5 to the film device 2 to create a seal with the channel surface 14. A companion aspect of the compressible spring 5 is that the resilient material comprising the spring is not capable of absorbing flowable material stiffening it to compressing backflow pressure, and alternatively capable of absorbing flowable material softening it to compressing backflow pressure among other properties. The internal structure of the compressible spring 5 can have one or more compressible density areas that provide passage control pressures and/or shape characteristics permitting such actions as shaping the film device 2 to take on contours that alleviate flow interference. One or more density areas can have similar and/or dissimilar materials arranged in layers of the same and/or varying thicknesses and/or areas and/or shapes to achieve this enhancement to pressure response and/or flow.

Figure 13:
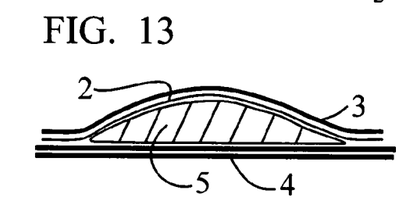
FIG. 13 is a cross-sectional view of a laterally extended fluid channel with sheet film device and compressible spring in a flow blocking relationship.
Figure 14:
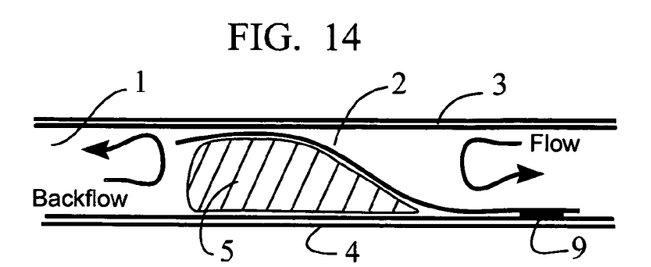
FIG. 14 is a longitudinal side view after FIG. 13 showing cpf valve parts in a flow blocking relationship.
Figure 15:
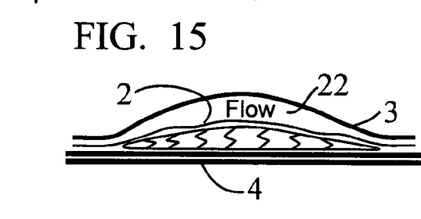
FIG. 15 is a cross-sectional view of a laterally extended fluid channel after FIG. 13 with film device and spring compressed by forward fluid pressure allowing flow wherein flow rate and ease is enhanced by greater cross-sectional area provided by extended lateral fluid channel.
Figure 16:
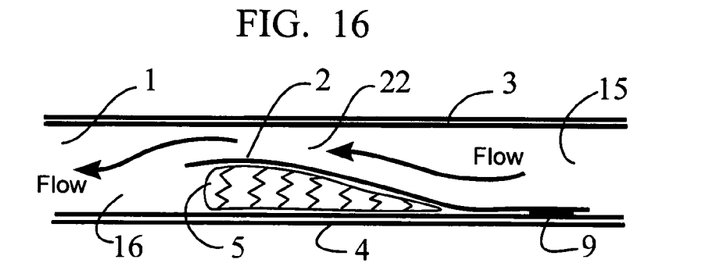
FIG. 16 is a longitudinal side view after FIG. 15 showing cpf valve parts in an unblocked relationship permitting forward fluid flow.
Figure 17:
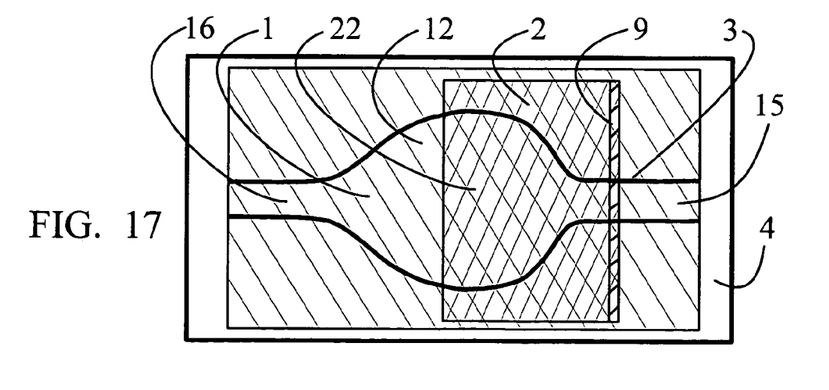
FIG. 17 is a schematic top view after FIGS. 13-16 showing the arrangement of parts with specific attention to showing the laterally extended fluid channel as applied to the sheet film device thereby opening a greater cross-sectional area as compared to the upstream channel for enhanced fluid flow.
Figure 18:
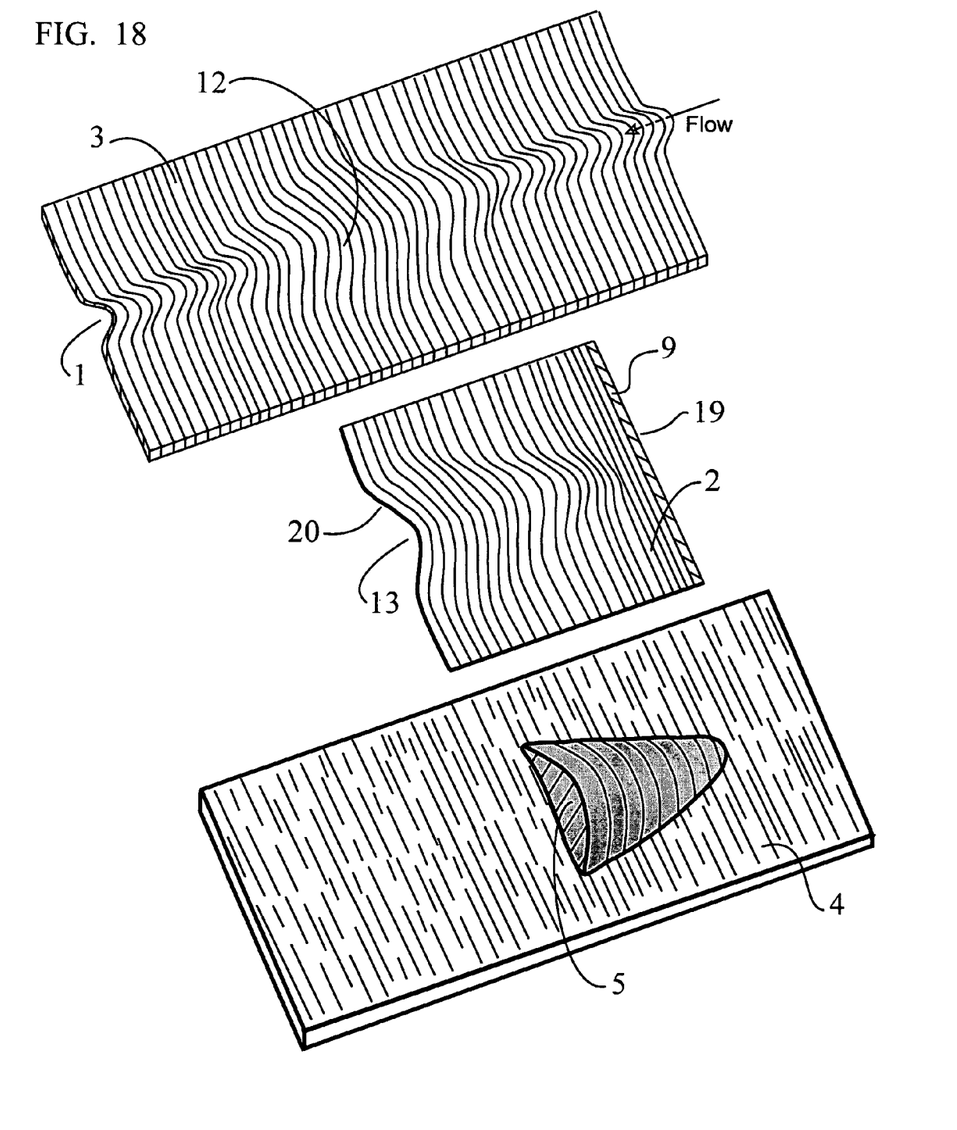
FIG. 18 is an isometric exploded view derived from FIGS. 13-17 comprised of parts therefrom with specific attention to showing the relational attributes of the laterally extended fluid channel and film device.
Figure 19:
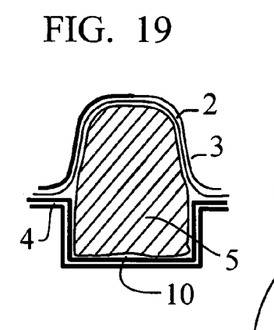
FIG. 19 is a lateral cross-sectional view of a recessed compressible spring in a fluid channel recess pocket with the film device in a flow blocking relationship.
Figure 20:
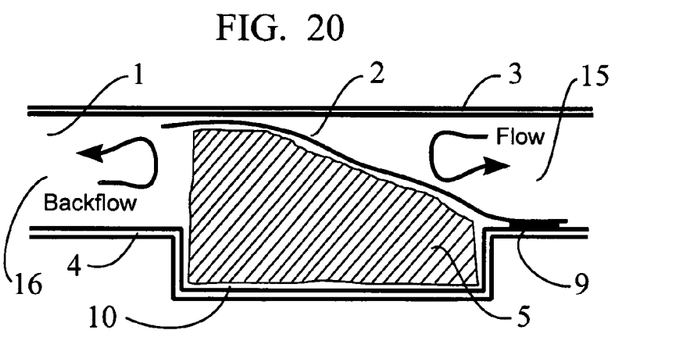
FIG. 20 is a longitudinal side view after FIG. 19 showing the recessed spring in the channel pocket with film device blocking fluid flow.
Figure 21:
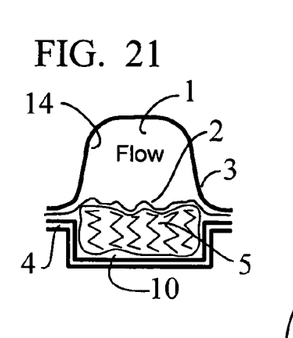
FIG. 21 is a lateral cross-sectional view of a recessed spring in a fluid channel pocket with spring compressed by forward fluid pressure so the film device opens an enhanced cross-sectional area to fluid flow by compressing spring into the space provided by the channel recess pocket.
Figure 22:
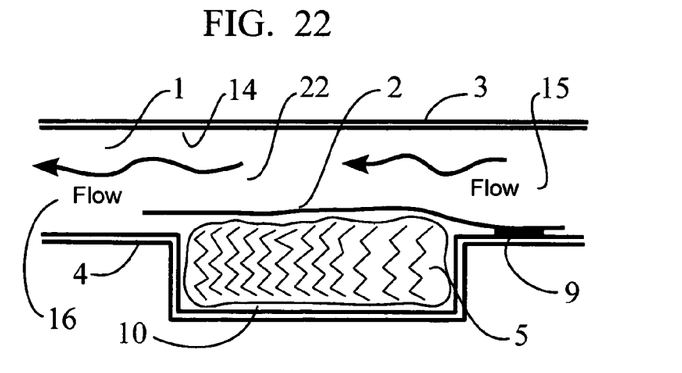
FIG. 22 is a longitudinal side view after FIG. 21 showing the compressed spring in a channel recess pocket with film device unblocking forward fluid flow when fluidic pressure exceeded a predetermined threshold point sufficient to compressible spring into channel recess pocket and affording comparable cross-sectional area to the upstream channel for enhanced fluid flow rate and ease.
Figure 23:
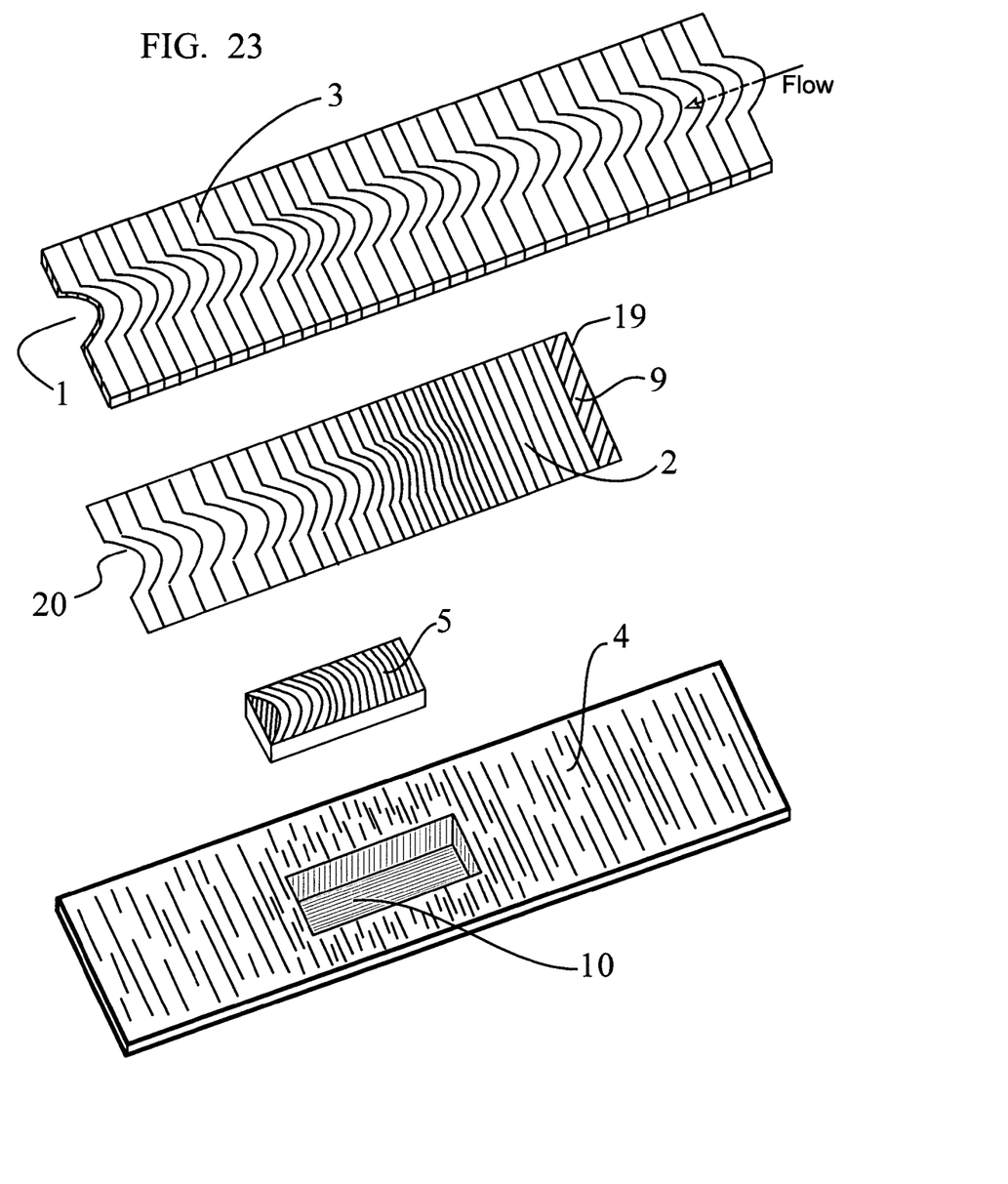
FIG. 23 is an isometric exploded view derived from FIGS. 19-22 comprised of parts therefrom with specific attention to showing the relational attributes of the recess pocket provided for the spring to enhance fluid flow.

In FIGS. 14-18 a series of views are shown where the basic curved sheet pliant film device 2 is shown in blocked (FIGS. 13-14) and open (FIGS. 15-16) configurations as has been previously described. An enhanced feature shown, made possible by the inherent nature of the cpf valve design, is the lateral widening of the fluid channel 1 in the vicinity of the fluid passage 22 as best illustrated in FIG. 17 where the fluid passage 22 is clearly laterally wider than the upstream channel 15. By laterally extending the fluid channel 1 in the area of the fluid passage 22 a greater area for flowable material to pass through is created which lessens flow constriction through the cpf valve. FIG. 15 shows this increased flow area of the fluid passage 22. This lateral widening over the upstream channel 15 to create an enlarged cross-sectional area for the fluid passage 22 alleviates the constriction of material flow through the fluid passage 22. FIG. 18 shows as exploded view of the cpf valve which exhibits this lateral widening of the fluid channel 22 and associated components. An alternative design that also creates an enhanced area for fluid flow is shown in FIGS. 19-23 where a recessed pocket 10 in the base channel wall 4 holds a portion of the compressible spring 5 so that upon compressing by forward fluidic pressure a substantial portion of the mass as volume of the compressible spring 5 is pushed out of the fluid channel 1 and into the recess pocket 10. By partially positioning portions of the compressible spring 5 in a recess in the channel surface the spring 5 may compress so as to open an enlarged cross-sectional area of the fluid passage 22 thereby alleviating constricted material flow through the fluid passage 22. In FIG. 23 the assembling of the parts is shown where the recess pocket 10 receives the compressible spring 5 which is in turn covered by pliant film device 2 which are then enclosed by a channel wall 3 structure to create a cpf valve previously described and operated by opening and closing the fluid passage 22 by varying upstream pressure above and below respectively a predetermined threshold pressure established by operational characteristics of the compressible spring 5 yet closing the fluid passage 22 as previously described to downstream backflow.

Figure 24:
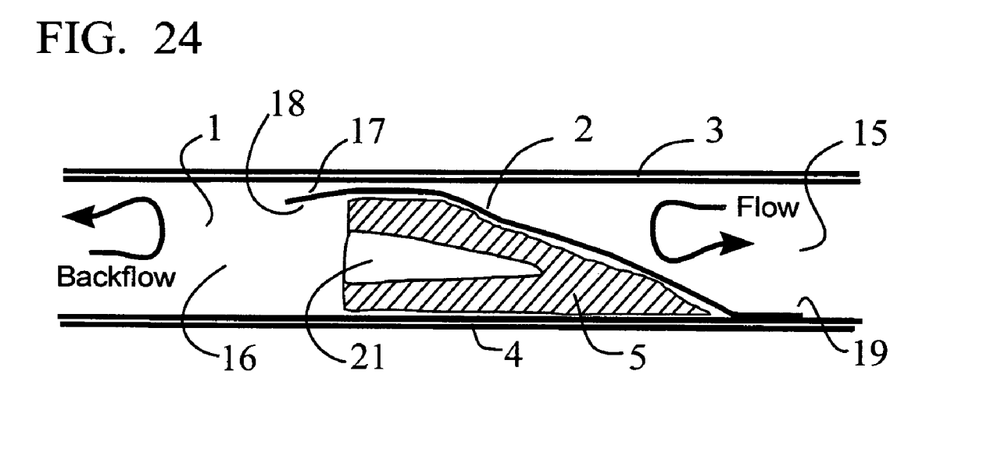
FIG. 24 is a longitudinal side view of a compressible spring incorporating a cavity to facilitate compressible attributes positioning a film device in a channel so as to create a blocking relationship to fluid flow.
Figure 25:
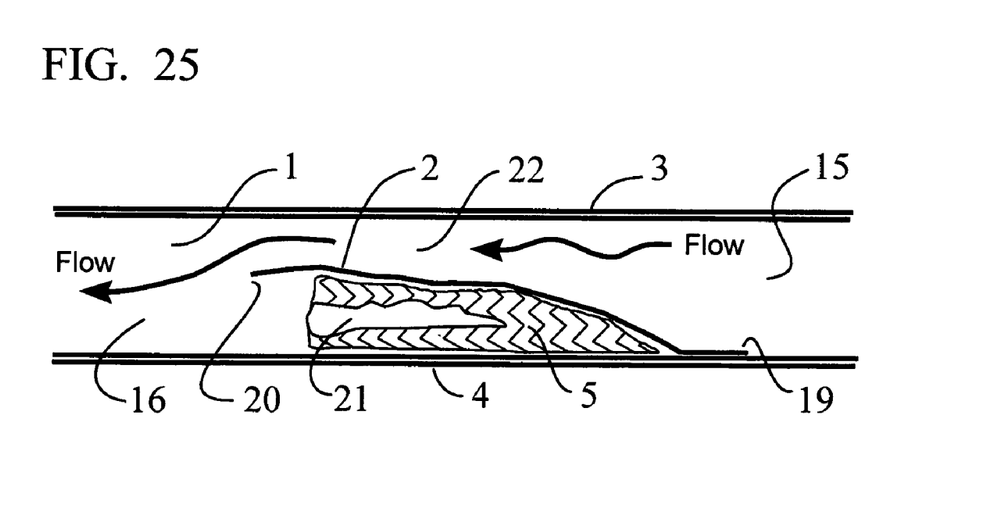
FIG. 25 is a longitudinal side view after FIG. 24 showing a compressed spring with a partially collapsed cavity advantaging compressibility attributes inherent to such compression characteristics.

In FIGS. 24-25 a cpf valve is shown in closed and open operation as previously described. Included is an enhancement where the compressible spring 5 has a hollow or cavity for altering compressibility characteristics by adjustments to the physical form of the spring 5. Not illustrated but now disclosed is that the spring 5 and/or film device 2 and/or channel wall 3 further comprises by content a filler incorporating at least one biocidal agent in sufficient quality to control various contamination within the cpf valve. Also not illustrated but now disclosed is that the spring 5 and/or film device 2 and/or channel wall 3 further comprises by content a filler incorporating at least one scenting agent in sufficient quality to impart a scent to flowable material within the cpf valve. Also not illustrated but now disclosed is that the spring 5 and/or film device 2 and/or channel wall 3 further comprises by content at least one magnetic and/or magnetizable particle arrayed sufficient to facilitate affixing and/or flow control features such as sealing.

The opportunities to use cpf valves as substitutes for conventional valves in fluid manipulating devices are varied and extensive. Typically the cpf valve design could replace conventional spring-and-ball valves employed as exit and/or inlet valves in all manner of fluid pumps. Cpf valves can find similar application as replacement for simple inline check valves in transfer systems conveying flowable material. These two examples are but a few examples of cpf valve applications. Cpf valves are simple, reliable, robust, and so economical as to be disposable; they open up many new design paths for controlling and moving fluids, pumps are only one category of such applications.

While these improvements have been illustrated and described with reference to certain preferred embodiments, the present invention is not limited thereto. In particular, the foregoing specification and embodiments are intended to be illustrative and are not to be taken as limiting. Thus, alternatives, such as structural or mechanical or functional equivalents, and other modifications will become apparent to those skilled in the art upon reading the foregoing description.

What is claimed is:

1. A one-way fluid control valve, comprising:
   a fluid channel defined by a channel wall forming a channel surface with upstream and downstream ends capable of containing and guiding flowable material,
   a pliant film device comprising top and bottom surfaces with upstream and downstream edges and capacity to closely conform to a channel surface and longitudinally positioned in and extending laterally across said fluid channel,
   attachment means capable of affixing at least said upstream edge of said film device to a portion of said channel surface so as to define a fluid passage whereby said fluid passage is arranged so as to pass all said flowable material between said top surface and said channel surface and a portion of said downstream edge of said film device affixed to a portion of said channel surface so as to leave a portion of said downstream edge unattached to said channel surface; and,
   a compressible spring in contact with a portion of said bottom surface of said film device so as to be sufficient in a relaxed state to positioning a portion of said top surface of said pliant film device against said channel surface so as to substantially prevent flow through said fluid passage by sealing off said fluid passage to said flowable material when fluidic pressure in an upstream channel is below a predetermined threshold pressure yet opening said passage to allow flow of said flowable material when upstream fluidic pressure exceeds said predetermined threshold pressure by compressing said compressible spring through pressure on said film device top surface sufficient to open a fluid passage between said film device top surface and said channel surface yet prevent backflow of flowable material motivated by positive downstream pressure whereby said backflow exerts pressure on said bottom surface of said film device sufficient to push corresponding said top surface against said channel surface so as to seal off said fluid passage thereby preventing said backflow material from passing upstream of affixed said pliant film device.

2. The valve of claim 1 wherein said channel surface is curved.

3. The valve of claim 2 wherein said curved channel surface facilitates said top surface of said pliant film device in closely conforming to said channel surface so as to prevent flow of said flowable material through said channel passage.

4. The valve of claim 1 wherein said predetermined threshold pressure substantially prevents unintended flow of said flowable material through said fluid passage.

5. The valve of claim 1 wherein said fluidic pressure in upstream channel greater than said predetermined threshold pressure is sufficient to open said fluid passage as to create a pressurized downstream dispensing flow defined as a spurt.

6. The valve of claim 1 wherein said fluid channel in the vicinity of said fluid passage formed by said pliant film device widens laterally over the upstream channel to create an enlarged cross-sectional area for said fluid passage thereby alleviating constricted material flow through said fluid passage.

7. The valve of claim 1 wherein the compressible spring is partially positioned in a recess in said channel surface in to which portions of said spring may compress so as to open an enlarged cross-sectional area of said fluid passage thereby alleviating constricted material flow through said fluid passage.

8. The valve of claim 1 wherein said pliant film device is constructed of at least one flexible polymeric material.

9. The valve of claim 1 wherein said pliant film device is in the form of a sheet with a portion arranged with an arch covering said compressible spring.

10. The valve of claim 1 wherein said pliant film device is in the form of a tube with a portion arranged to encircle said compressible spring.

11. The valve of claim 1 wherein said pliant film device provides a wide longitudinal top surface area capable of sealing off said fluid passage when pressed against said channel surface whereby said wide longitudinal top surface area facilitates passage sealing by overcoming leakage created by surface irregularities and/or trapped solid content carried by said flowable materials.

12. The valve of claim 1 wherein said attachment means includes capturing portions of said pliant film device in joints of said channel wall which define said fluid channel.

13. The valve of claim 1 wherein said attachment means is selected from a group including adhesives, clamps, mechanical fasteners, pressure devices, tension devices, magnetism, heat seals, chemical seals, and combinations thereof.

14. The valve of claim 1 wherein portions of said compressible spring are affixed to portions of said pliable film device and/or said channel surface.

15. The valve of claim 1 wherein said compressible spring is selected from a group of resilient material including polymeric foams, natural rubbers, synthetic rubbers, thermoplastics, organic fibers, synthetic fibers, metals, plastics, resins, glasses, and combinations thereof.

16. The valve of claim 15 wherein said compressible spring is comprised of said resilient material not capable of absorbing said flowable material.

17. The valve of claim 15 wherein said compressible spring is comprised of said resilient material capable of absorbing said flowable material.

18. The valve of claim 1 wherein said compressible spring has physical features which provide resilient and/or compression characteristics selected from a group of form attributes including cavities, hollows, arches, curves, tapers, grooves, planes, incisions, creases, indentations and combinations therefore.

19. The valve of claim 1 wherein said compressible spring has one or more compressibility density areas that provides passage control pressures and/or shape characteristics.

20. The valve of claim 19 wherein said compressible spring has one or more said density areas of similar and/or dissimilar material arranged as layers of the same and/or varying thicknesses and/or areas and/or shapes.

21. The valve of claim 1 wherein said backflow prevention permits generation of upstream negative pressure conditions useful to upstream operations employing negative pressure.

22. The valve of claim 1 wherein said downstream edge of said pliant film device protrudes beyond said compressible spring.

23. The valve of claim 1 wherein a portion of affixed said downstream edge prevents dislodgement of said plaint film device by said backflow pressure in downstream channel.

24. The valve of claim 1 wherein a portion of affixed said upstream edge prevents dislodgement of said pliant film device by forward said fluidic pressure in upstream channel.

25. The valve of claim 1 wherein said channel wall is made of one or more polymers, thermoplastic moldings, resin castings, metals, glasses, ceramics, extrusions, laminates, compositions, and combinations thereof.

26. The valve of claim 1 wherein said pliant film device and/or channel wall and/or compressible spring further comprises a filler comprising at least one biocidal agent sufficient to control contamination.

27. The valve of claim 1 wherein said pliant film device and/or channel wall and/or compressible spring further comprises a filler comprising at least one scenting agent sufficient to impart scent to said flowable material.

28. The valve of claim 1 wherein said pliant film device and/or channel wall and/or compressible spring further comprises a filler comprising at least one magnetic and/or magnetizable particle arranged sufficient to facilitate affixing and/or flow control.

29. The value of claim 1 wherein said valve is incorporated as an exit and/or inlet valve in a pump moving fluid.

30. The valve of claim 1 wherein said valve is incorporated as a check valve in a transfer system conveying flowable material.

31. A method of operating a valve according to claim 1, wherein said method comprises opening and closing said fluid passage by varying said upstream pressure above and below respectively said predetermined threshold pressure.

32. The method of claim 31 further including the step of closing said fluid passage to downstream backflow.

33. A method of pumping fluid, said method comprising:
  incorporating the fluid control valve of claim 1 as one-way inlet and/or outlet valves of a fluid pump with inlet and outlet ports;
  providing a quantity of flowable material to said inlet port of said pump to be pumped through said pump to exit out said outlet port; and,
  cycling said pump operationally at least once to move said flowable material through said pump whereby said flowable material is moved in from said inlet port and out from said outlet port.

* * * * *